(12) United States Patent
Fiekens et al.

(10) Patent No.: US 10,919,766 B2
(45) Date of Patent: Feb. 16, 2021

(54) OZONE GENERATION WITH DIRECTLY COOLED PLASMA CHANNELS

(71) Applicant: XYLEM IP MANAGEMENT S.à r.l., Senningerberg (LU)

(72) Inventors: Ralf Fiekens, Schlossholte-Stukenbrock (DE); Reiner Fietzek, Herford (DE); Manfred Salvermoser, Herford (DE); Nicole Brüggemann, Enger (DE)

(73) Assignee: XYLEM IP MANAGEMENT S.à r.l., Senningerberg (LU)

( * ) Notice: Subject to any disclaimer, the term of this patent is extended or adjusted under 35 U.S.C. 154(b) by 26 days.

(21) Appl. No.: 15/769,959

(22) PCT Filed: Oct. 19, 2016

(86) PCT No.: PCT/EP2016/075106
§ 371 (c)(1),
(2) Date: Apr. 20, 2018

(87) PCT Pub. No.: WO2017/067991
PCT Pub. Date: Apr. 27, 2017

(65) Prior Publication Data
US 2018/0312401 A1 Nov. 1, 2018

(30) Foreign Application Priority Data
Oct. 21, 2015 (EP) .................. 15190727.6

(51) Int. Cl.
*C01B 13/11* (2006.01)
(52) U.S. Cl.
CPC .......... *C01B 13/11* (2013.01); *C01B 2201/22* (2013.01); *C01B 2201/24* (2013.01); *C01B 2201/32* (2013.01); *C01B 2201/70* (2013.01)

(58) Field of Classification Search
None
See application file for complete search history.

(56) References Cited

U.S. PATENT DOCUMENTS

| 648,764 A | 5/1900 | Lamprey |
|---|---|---|
| 5,529,760 A | 6/1996 | Burris |
| (Continued) | | |

FOREIGN PATENT DOCUMENTS

| DE | 19546355 A1 | 6/1996 |
|---|---|---|
| DE | 20211429 U1 | 1/2003 |
| (Continued) | | |

OTHER PUBLICATIONS

International Preliminary Report on Patentability for International Application No. PCT/EP2016/075106, dated Apr. 24, 2018—5 pages.

(Continued)

*Primary Examiner* — Kishor Mayekar
(74) *Attorney, Agent, or Firm* — RatnerPrestia

(57) ABSTRACT

An ozone generator with a high voltage electrode and at least one counter electrode which limit a gap in which at least one dielectric and an electrically non-conductive structure are arranged and through which a stream of gas flows in a direction of flow. The high voltage electrode and the at least one counter electrode are provided with a connection for an electrical voltage supply in order to generate silent discharges. The electrically non-conductive structure contains pores with a nominal pore size (x) of 100 μm<x<1 mm.

18 Claims, 2 Drawing Sheets

(56) References Cited

U.S. PATENT DOCUMENTS

Figure 3:
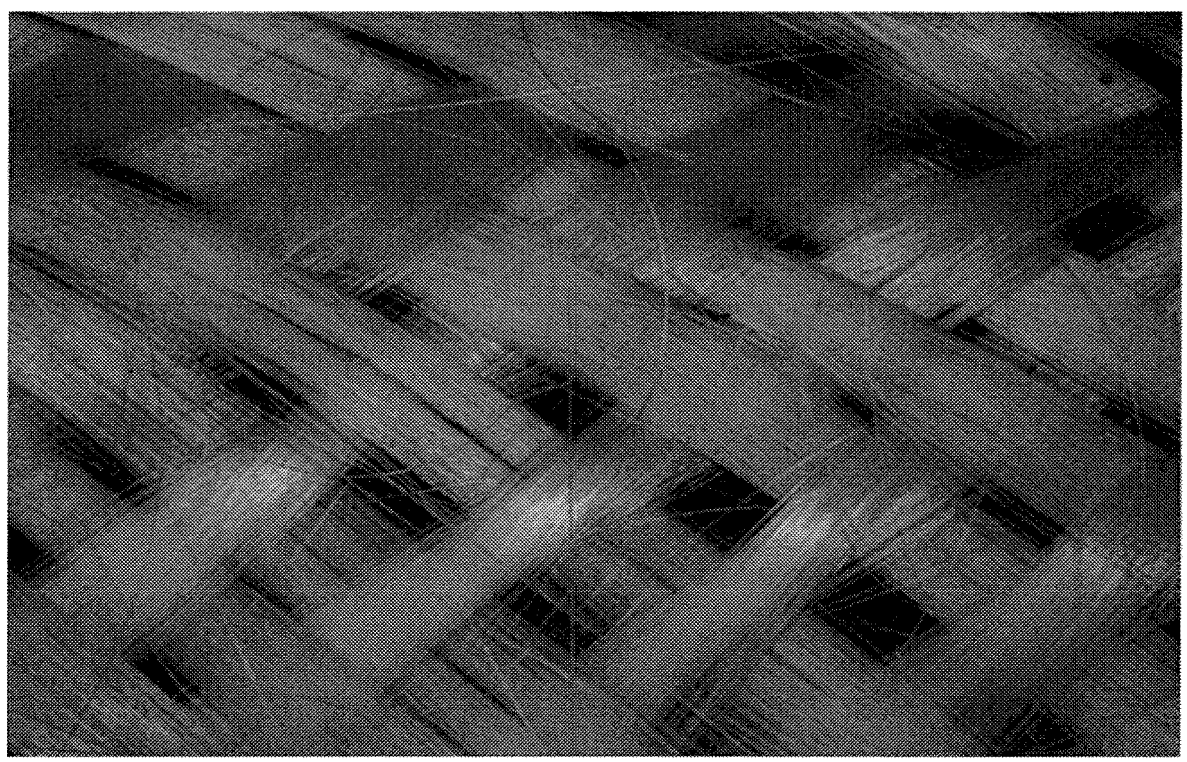

| | | |
|---|---|---|
| 5,855,856 A | 1/1999 | Karlson |
| 6,106,788 A | 8/2000 | Rau et al. |
| 6,136,278 A | 10/2000 | Eliasson et al. |
| 2003/0098230 A1* | 5/2003 | Carlow ................ B01D 53/323 204/164 |
| 2004/0022701 A1 | 2/2004 | Segal et al. |
| 2004/0076560 A1* | 4/2004 | Tabata .................... C01B 13/11 422/186.07 |
| 2005/0064248 A1 | 3/2005 | O'Donnell et al. |

FOREIGN PATENT DOCUMENTS

| | | |
|---|---|---|
| EP | 0369366 A2 | 5/1990 |
| EP | 0900591 A1 | 3/1999 |
| WO | 9316001 A1 | 8/1993 |
| WO | W09709268 A1 | 3/1997 |

OTHER PUBLICATIONS

International Search Report and Written Opinion for International Application No. PCT/EP2016/075106, dated Jan. 20, 2017—7 pages.

Final Office Action for U.S. Appl. No. 15/755,601, dated Jun. 4, 2020, 9 pages.

\* cited by examiner

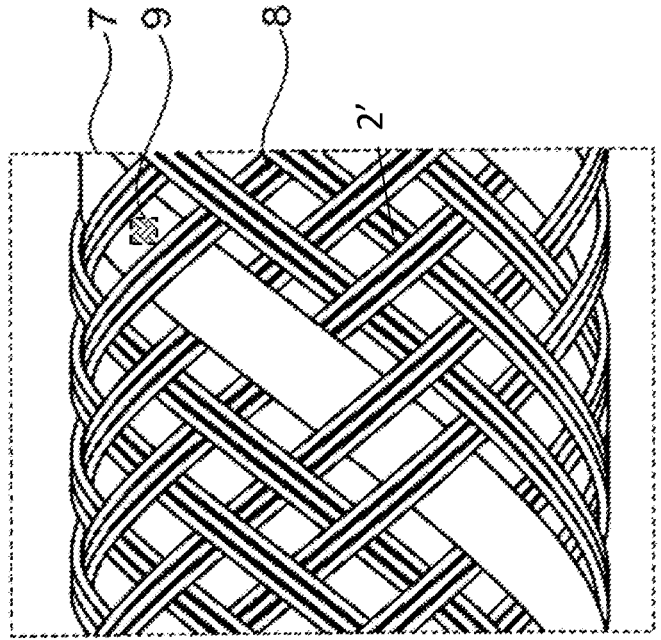
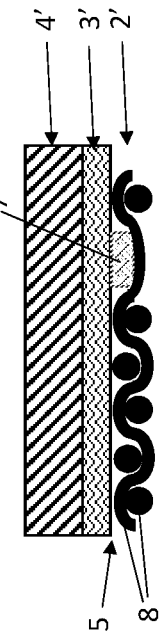
Fig. 2A
Fig. 2B
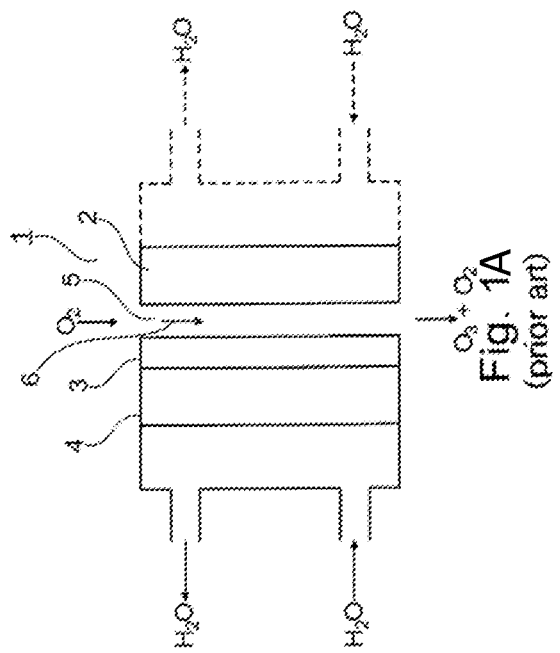
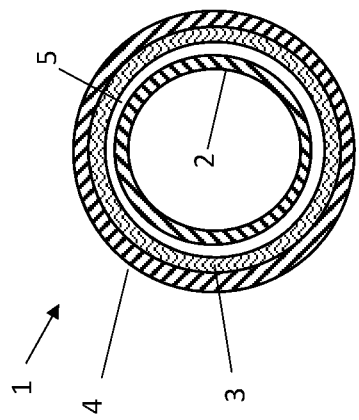
Fig. 1A (prior art)
Fig. 1B (prior art)

OZONE GENERATION WITH DIRECTLY COOLED PLASMA CHANNELS

CROSS-REFERENCE TO RELATED APPLICATIONS

This patent application is a U.S. National Phase Patent Application of PCT Application No.: PCT/EP2016/075106, filed Oct. 19, 2016, which claims priority to European Patent Application No. 15190727.6, filed Oct. 21, 2015, each of which is incorporated by reference herein in its entirety.

FIELD OF THE INVENTION

The present invention relates to an ozone generator with a high voltage electrode and at least one counter electrode which limit a gap in which at least one dielectric and an electrically non-conductive structure are arranged, and the corresponding non-conductive structure.

BACKGROUND OF THE INVENTION

The efficiency of ozone generators depends to a great extent on the temperature in the discharge gap. On the one hand, this is due to the fact that the ozone-formation reaction proceeds better at low temperatures, and on the other hand the kinetics of the ozone depletion mechanism increase exponentially with the temperature. An effective cooling of the gas space is thus essential for efficient ozone generation. Ozone generators cooled with water on one or two sides are known from the prior art. Their limiting factor in terms of heat transport is the thermal conductivity within the discharge gap. In comparison with the gas which flows through the discharge gap, the electrode material, for example stainless steel, conducts the heat more effectively by two to three orders of magnitude.

Several different measures for cooling the ozone generator are realised in U.S. Pat. No. 5,855,856. The tube-type ozone generator possesses both an inner cooling and an outer cooling. Heat-absorbing objects in the form of swarf or fibres are arranged within these cooling spaces. These objects can be made of materials with high thermal conductivities and non-corrosive properties. The gas is fed to the ozone generator tangentially in order to create a spiral flow which is in addition intended to cool the inner electrode. In addition, a part of the product gas is drawn off, cooled and fed to the gas. The whole construction is very complex, but does not improve the limiting step of the transport of heat from the discharge gap.

The specification EP 0 369 366 A3 describes an arrangement in which a plurality of thermally conductive solids is arranged in the reaction space. These solids serve to create an equalisation of heat between regions within the ozone reactor with higher temperature and lower temperature. In order to achieve this, these solids need to touch one another and need to be in contact with the dielectric and/or an electrode and/or both electrodes.

A material mix of electrically conductive and electrically non-conductive material is described in the patent specification U.S. Pat. No. 648,764. Pearls or plates made of the two materials are lined up like a string of pearls. The dimensions of the pearls of the electrically non-conductive material are thereby larger, since an improved ozone yield is achieved through a greater distance between the electrical conductor and the dielectric separator.

The introduction of dielectric materials serves generally to adjust the gap width (spacer), as flow-disrupting material (gas mixing) or to direct the flow.

SUMMARY OF THE INVENTION

It is the object of the present invention to provide an ozone generator which exhibits a good transport of heat in the discharge gap. It is also the object of the invention to provide an electrically non-conductive structure for use in a chamber of an ozone generator through which gas flows which transports the heat away efficiently.

The term "fabric" (woven or non-woven fabric) is known from textiles technology. A textile fabric can refer to any planar structure made from textile raw materials using a textile technology. Accordingly, in the context of the present patent application a fabric is understood to mean any flat, curved or convex planar structure manufactured using a textile technology. These include, inter alia, non-woven fabrics, such as tissue, knitted fabrics, meshes and nets, and fibre composite fabrics such as non-wovens and cotton wool. On the other hand, a structure is understood to mean any type of fabric and more solid structures such as lattices.

The aforementioned object is achieved by means of an ozone generator as described in the following.

In an ozone generator of the generic type, as the electrically non-conductive structure contains pores, wherein the nominal pore size (x) is 100 µm<x<1 mm, the heat released in an individual discharge can be transferred quickly and directly to the non-conductive structure, so reducing the temperature-induced ozone depletion. This leads to an improved efficiency of the ozone generator.

A simple-to-manufacture structure results if the electrically non-conductive structure is a fabric. In particular, the electrically non-conductive structure can be a woven fabric or mesh.

The further dissipation of the heat is improved if the electrically non-conductive structure is at least partially in planar contact with the at least one dielectric.

Advantageously, the fabric has a nominal pore size greater than 100 µm and less than 1000 µm, in particular less than 750 µm. In particular, the nominal pore size (x) is advantageously less than 500 µm and particularly preferably less than 250 µm.

The electrically non-conductive structure is preferably made of ceramic and/or glass.

A particularly high efficiency is achieved if the high voltage electrode is also at least partially formed from a metallic fabric.

The object is also achieved by means of an electrically non-conductive structure of the generic type which has pores which have a nominal pore size (x) of 100 µm<x<1 mm. Preferably, the electrically non-conductive structure is a fabric made of glass fibre or ceramic fibre.

In order to achieve a particularly high efficiency it is preferable if the nominal pore size (x) is 100 µm<x<250 µm, because in this case a particularly effective heat dissipation can be achieved.

BRIEF DESCRIPTION OF THE DRAWING FIGURES

An embodiment of the invention is described in more detail with reference to the drawings.

In the drawings:

FIG. 1A: shows an electrode arrangement of a plate-type single-gap ozone generator;

FIG. 1B: shows an electrode arrangement of a tube-type single-gap ozone generator;

FIG. 2A: shows a combined electrode and fabric arrangement;

FIG. 2B: shows the combined electrode and fabric arrangement of FIG. 2A in an ozone generator of the types depicted in FIG. 1A or 1B; and FIG. 3: shows a non-metallic fabric.

DETAILED DESCRIPTION OF THE FIGURES

FIG. 1A shows a schematic cross-section of an electrode arrangement of a single-gap ozone generator 1 in the construction form of a plate-type ozone generator without a fabric arranged in the gap. FIG. 1B shows a schematic cross-section of an electrode arrangement of a single-gap ozone generator 1 in the construction form of a tube-type ozone generator without a fabric arranged in the gap. In this respect, FIGS. 1A and 1B correspond to the prior art. Such ozone generators 1 can be designed as plate-type ozone generators or tube-type ozone generators, depending on the field of application.

Plate-type ozone generators have a high voltage electrode 2 and at least one counter electrode 4 which are plate-formed in design. The electrodes 2, 4 limit a gap 5 through which an oxygen-containing gas 6 flows and in which a dielectric 3 is arranged. Conventionally, plate-type ozone generators are cooled on one or two sides by a cooling medium passed along the outer sides of the electrodes 2, 4. Air and water are used as cooling media.

Tube-type ozone generators are conventionally used in an ozone generator in groups. The ozone generators are thereby arranged parallel to one another between two tube plates in the manner of a tube bundle heat exchanger. Analogously to the plate-type ozone generators, tube-type ozone generators have a tubular-formed high voltage electrode 2, a tubular-formed dielectric 3 and a tubular-formed counter electrode 4. The arrangement is rotationally symmetrical. The high voltage electrode 2 and the counter electrode 4 are oriented concentrically to one another. They limit a gap 5 through which an oxygen-containing gas flows and in which the dielectric 3 is arranged. The externally-arranged counter electrode 4 is designed in the form of a stainless steel tube. The waste heat generated during the ozone production is cooled by means of cooling water (identified in FIG. 1 with $H_2O$) which is passed along the outer side of the counter electrode 4. It is also possible for the generator 1 to be cooled on two sides in that cooling water also flows through the high voltage electrode 2 on the inner side.

In order to generate ozone, molecular oxygen is first dissociated into atomic oxygen, which then forms ozone through reaction with an oxygen molecule. The theoretical value of 1.47 eV required in order to generate an ozone molecule cannot be achieved in practice. Due to losses occurring during the course of the multi-stage reaction, the efficiency of the ozone generation is significantly lower. The dissociation of the oxygen molecule first takes place via different excitation states of the oxygen molecule. During the decomposition of the excited oxygen molecules or during the ozone formation, energy is released which is not available for the further dissociation of oxygen molecules, but leads to heating of the gas. These processes take place directly in the microdischarges.

According to the invention, an electrically non-conductive structure 7, represented in FIG. 2A in an exemplary embodiment, is introduced into the gas flow 6 of an ozone generator 1 (plate- or tube-type generator) or the discharge gap, such as is depicted in FIG. 2B. The electrically non-conductive structure 7 consists of an efficiently thermally conductive and porous material. The porosity of the electrically non-conductive material is defined by the nominal pore size, which corresponds to the average pore size (arithmetic mean). The pore size is the diameter of the largest spherical ball which can pass through the pore. The nominal pore size of the electrically non-conductive material is matched to the size of the microdischarges in the discharge gap. The microdischarges have a diameter of around 100 µm. The pore size of the electrically non-conductive materials therefore preferably amounts to between 100 µm and 1 mm. The electrically non-conductive structure 7 thus represents a direct heat coupling to the discharge and the adjacent cool electrode and dielectric surfaces. The structure 7 is in contact with the dielectric 3' and the electrode 2' at numerous points, or at least partially in a planar manner. The contact surface is thereby as large as possible. The electrically non-conductive material is ozone and corrosion-resistant. It is thereby preferable if the structure 7 is a fabric made of glass fibre or ceramic fibre 9. As a result of the pores in the structure 7, heat is coupled directly to the microdischarges.

Such a preferred structure 7 is illustrated in FIG. 3, which shows a microscopic photograph of a woven fabric made of ceramic filaments.

All the described embodiments are used both in tube-type ozone generators as well as in plate-type ozone generators. The arrangement of the structure according to the invention is particularly preferable in multiple-gap systems, which have longer heat transmission paths than single-gap ozone generators. The electrically non-conductive structure 7 can thereby be provided in the outer gap and/or in at least one of the inner gaps.

The structure can be introduced into the discharge gap with or without carrier materials. The carrier materials can be designed in any form, for example as a rod, tube, plate, etc.

The high voltage electrode can be formed, completely or partially, of a metallic fabric. It can be seen in FIG. 2 that a number of electrical conductors 8 are woven together with the structure made from the ceramic fibres 9.

The ozone generator according to the invention and with it the electrically non-conductive porous structure improve the efficiency of ozone generators in that the transport of heat in the discharge gap is increased. In addition to the pores, which couple directly to the microdischarges and transport the heat away, the electrically non-conductive structure has the largest possible contact surface with the adjacent electrode and/or dielectric surfaces. In this way, a very high cooling efficiency can be achieved even with larger gap widths. Moreover, the efficient heat coupling allows ozone generation at high temperatures above 40° C.

The invention claimed is:

1. An ozone generator with a high voltage electrode and at least one counter electrode which limit a gap in which at least one dielectric and an electrically non-conductive structure are arranged and through which a stream of gas can flow in a direction of flow,
    wherein the high voltage electrode and the at least one counter electrode comprise a connection for an electrical voltage supply in order to generate silent discharges,
    wherein the the electrically non-conductive structure includes pores with a nominal pore size (x) within a range of 100 µm<x<1 mm,
    wherein the electrically non-conductive structure is a fabric consisting of non-conductive materials, the fabric at least partially in contact with the at least one dielectric and the high voltage electrode, and wherein the electrically non-conductive structure is disposed on a carrier.

2. The ozone generator according to claim 1, wherein the electrically non-conductive structure is a woven fabric or mesh.

3. The ozone generator according to claim 1, wherein the electrically non-conductive structure is at least partially in planar contact with the at least one dielectric.

4. The ozone generator according to claim 1, wherein the nominal pore size (x) is 100 µm<x<750 µm.

5. The ozone generator according to claim 1, wherein the nominal pore size (x) is 100 µm<x<500 µm.

6. The ozone generator according to claim 1, wherein the nominal pore size (x) is 100 µm<x<250 µm.

7. The ozone generator of claim 6, wherein the fabric of the electrically non-conductive structure comprises a woven fabric or mesh of ceramic fibers or glass fibers, and the high voltage electrode is formed at least partially from a metallic fabric.

8. The ozone generator of claim 7, wherein the high voltage electrode, the at least one dielectric, and the at least one counter electrode all have a tubular form.

9. The ozone generator of claim 8, wherein the high voltage electrode, the at least one dielectric, and the at least one counter electrode are disposed in a rotationally symmetrical arrangement.

10. The ozone generator of claim 9, wherein the high voltage electrode and the at least one counter electrode are oriented concentrically to one another.

11. The ozone generator of claim 10, wherein the ozone generator is one of a plurality of like ozone generators arranged parallel to one another in a bundle, with a source of cooling water configured to be passed along an outer side of the at least one counter electrode.

12. The ozone generator of claim 11, wherein the at least one counter electrode comprises stainless steel.

13. The ozone generator of claim 12, wherein the plurality of like ozone generators arranged parallel to one another are disposed between two tube plates and are configured as a tube bundle heat exchanger.

14. The ozone generator of claim 6, wherein the high voltage electrode, the at least one dielectric, and the at least one counter electrode all have a tubular form, wherein the high voltage electrode is disposed within the at least one counter electrode, and an exterior surface of the at least one counter electrode and an interior surface of the high voltage electrode are both configured to receive a flow of cooling water.

15. The ozone generator according to claim 1, wherein the electrically non-conductive structure is made of ceramic or glass.

16. The ozone generator according to claim 1, wherein the high voltage electrode is formed at least partially from a metallic fabric.

17. The ozone generator of claim 1, wherein the carrier comprises the high voltage electrode, the fabric of the electrically non-conductive structure comprises a woven fabric or mesh of ceramic fibers or glass fibers, and the high voltage electrode is formed at least partially from a metallic fabric comprising electrical conductors woven together with the non-conductive structure.

18. The ozone generator of claim 1, wherein the carrier comprises one of: a rod, a tube, a plate, or the high-voltage electrode.

* * * * *